US005739189A

United States Patent [19]

Lorenz et al.

[11] Patent Number: 5,739,189

[45] Date of Patent: Apr. 14, 1998

[54] LOW ENERGY THERMAL TRANSFER FORMULATION

[75] Inventors: Michael A. Lorenz, Miamisburg, Ohio; Monica N. Lewis, St. Louis, Mo.; Frank J. Kenny, Carrollton, Ohio

[73] Assignee: NCR Corporation, Dayton, Ohio

[21] Appl. No.: 573,972

[22] Filed: Dec. 18, 1995

[51] Int. Cl.$^6$ .......................... C08K 5/09; B32B 27/14; B32B 9/04

[52] U.S. Cl. .......................... 524/300; 524/88; 524/277; 524/300; 524/322; 524/424; 428/195; 428/484; 428/500; 428/913

[58] Field of Search .......................... 524/88, 277, 300, 524/322, 424; 428/195, 484, 500, 913

[56] References Cited

U.S. PATENT DOCUMENTS

| | | | |
|---|---|---|---|
| 3,663,278 | 5/1972 | Blose et al. | 117/234 |
| 4,315,643 | 2/1982 | Tokunaga | 282/27.5 |
| 4,403,224 | 9/1983 | Winowski | 346/1.1 |
| 4,463,034 | 7/1984 | Tokunaga et al. | 427/256 |
| 4,523,207 | 6/1985 | Lewis et al. | 346/214 |
| 4,592,946 | 6/1986 | Shuman | 428/200 |
| 4,628,000 | 12/1986 | Talvalkar et al. | 428/341 |
| 4,687,701 | 8/1987 | Knirsch et al. | 428/216 |
| 4,698,268 | 10/1987 | Ueyama | 428/484 |
| 4,707,395 | 11/1987 | Ueyama et al. | 428/212 |
| 4,777,079 | 10/1988 | Nagamoto et al. | 428/212 |
| 4,778,729 | 10/1988 | Mizobuchi | 428/484 |
| 4,869,941 | 9/1989 | Ohki | 428/40 |
| 4,923,749 | 5/1990 | Talvalkar | 428/341 |
| 4,975,332 | 12/1990 | Shini et al. | 428/500 |
| 4,983,446 | 1/1991 | Taniguchi et al. | 428/216 |
| 4,988,563 | 1/1991 | Wehr | 428/341 |
| 5,128,308 | 7/1992 | Talvalkar | 503/201 |
| 5,240,781 | 8/1993 | Obatta et al. | 428/488.4 |
| 5,248,652 | 9/1993 | Talvalkar | 503/201 |

*Primary Examiner*—Kriellion S. Morgan
*Attorney, Agent, or Firm*—Richard J. Traverso

[57] ABSTRACT

There is provided by the present invention a coating formulation for thermal transfer ribbons which employ active plasticizers that reduce the softening temperature of the ink layer and volatilize from the ink layer or react with components therein when heated during transfer to provide images with high scratch and smear resistance.

17 Claims, 1 Drawing Sheet

LOW ENERGY THERMAL TRANSFER FORMULATION

FIELD OF THE INVENTION

The present invention relates to thermal transfer printing wherein images are formed on a receiving substrate by heating extremely precise areas of a print ribbon with thin film resistors. This heating of the localized area causes transfer of ink or other sensible material from the ribbon to the receiving substrate. The sensible material is typically a pigment or dye which can be detected optically or magnetically.

BACKGROUND OF THE INVENTION

Thermal transfer printing has displaced impact printing in many applications due to advantages such as the relatively low noise levels which are attained during the printing operation. Thermal transfer printing is widely used in special applications such as in the printing of machine readable bar codes and magnetic alpha-numeric characters. The thermal transfer process provides great flexibility in generating images and allows for broad variations in style, size and color of the printed image. Representative documentation in the area of thermal transfer printing includes the following patents.

U.S. Pat. No. 3,663,278, issued to J. H. Blose et al. on May 16, 1972, discloses a thermal transfer medium having a coating composition of cellulosic polymer, thermoplastic resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,523,207, issued to M. W. Lewis et al. on Jun. 11, 1985, discloses a multiple copy thermal record sheet which uses crystal violet lactone and a phenolic resin.

U.S. Pat. No. 4,628,000, issued to S. G. Talvalkar et al. on Dec. 9, 1986, discloses a thermal transfer formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,698,268, issued to S. Ueyama on Oct. 6, 1987, discloses a heat resistant substrate and a heat-sensitive transferring ink layer. An overcoat layer may be formed on the ink layer.

U.S. Pat. No. 4,707,395, issued to S. Ueyama et al. on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,778,729, issued to A. Mizobuchi on Oct. 18, 1988, discloses a heat transfer sheet comprising a hot melt ink layer on one surface of a film and a filling layer laminated on the ink layer.

U.S. Pat. No. 4,869,941, issued to Ohki on Sep. 26, 1989, discloses an imaged substrate with a protective layer laminated on the imaged surface.

U.S. Pat. No. 4,923,749, issued to Talvalkar on May 8, 1990, discloses a thermal transfer ribbon which comprises two layers, a thermal sensitive layer and a protective layer, both of which are water based.

U.S. Pat. No. 4,975,332, issued to Shini et al. on Dec. 4, 1990, discloses a recording medium for transfer printing comprising a base film, an adhesiveness improving layer, an electrically resistant layer and a heat sensitive transfer ink layer.

U.S. Pat. No. 4,983,446, issued to Taniguchi et al. on Jan. 8, 1991, describes a thermal image transfer recording medium which comprises as a main component, a saturated linear polyester resin.

U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar each disclose a thermal transfer ribbon having a reactive dye which generates color when exposed to heat from a thermal transfer printer.

And, U.S. Pat. No. 5,240,781, issued to Obatta et al. discloses an ink ribbon for thermal transfer printers having a thermal transfer layer comprising a wax-like substance as a main component and a thermoplastic adhesive layer having a film forming property.

There are some limitations on the applications for thermal transfer printing. For example, the properties of the thermal transfer formulation which permit transfer from a carrier to a receiving substrate can place limitations on the permanency of the printed matter. Printed matter from conventional processes can smear or smudge, especially when subjected to a subsequent sorting operation. Additionally, where the surface of a receiving substrate is subject to scratching, the problem is compounded. This smearing can make character recognition such as optical character recognition or magnetic ink character recognition difficult and sometimes impossible. In extreme cases, smearing can make it difficult to read bar codes.

Many attempts have been made to provide high integrity thermal transfer printing which is resistant to scratching and smearing, some of which are described above. For example, Talvalkar provides print with improved smear resistance from a thermal transfer formulation which contains thermally reactive materials in U.S. Pat. Nos. 5,128,308 and 5,248,652. For non-reactive thermal transfer formulations, it is generally known to those skilled in the art that higher melting resins and/or waxes can provide a higher degree of scratch and smear resistance. However, higher print head energies are necessary to achieve the desired flow to promote transfer and adhesion to a receiving substrate. An alternative thermal transfer formulation which provides printed images with high scratch and smear resistance and which can be employed using low print head energies is desired.

SUMMARY OF THE INVENTION

It is the object of the present invention to provide a thermal transfer formulation which provides printed images which are resistant to scratching and smearing.

It is the further object of the present invention to provide a thermal transfer ribbon which provides scratch and smear resistant images.

It is another object of the present invention to provide a thermal transfer formulation, and thermal transfer ribbon obtained therefrom, which provide scratch and smear image resistant images at low print head energies.

It is an additional object of the present invention to provide a thermal transfer formulation and ribbon which provide scratch and smear resistant images at low print head energies through the use of volatile or reactive plasticizers.

It is still another object of the present invention to provide a thermal transfer formulation and a thermal transfer ribbon which employ non-reactive binder components.

These and other objects and advantages of the present invention will become apparent and further understood from the detailed description and claims which follow, together with the annexed drawings.

The above objects are achieved through the coating formulation of the present invention which provides a thermal transfer layer on a thermal transfer medium which softens and flows at a temperature below 250° C. so as to provide an image with the use of a thermal printer having a print head which operates at a temperature in the range of 100° C. to 250° C., said formulation comprising a solid thermoplastic resin having a melting/softening point in the range of 50° C. to 300° C., a wax, a sensible material, and an active plasticizer with a boiling point in the range of 100° C. to 250° C. and/or unsaturated groups which react at a temperature in the range of 60° C. to 250° C.

In another aspect of the present invention, there is provided a thermal transfer ribbon comprising a flexible substrate with a thermal transfer layer deposited thereon which softens and flows at a temperature below 250° C., said thermal transfer layer comprising a solid thermoplastic resin having a melting point above the softening point of the thermal transfer layer, an active plasticizer having a boiling point below 250° C., and/or unsaturated groups which react at a temperature in the range of 100° C. to 250° C., a wax and a sensible material.

DETAILED DESCRIPTION OF THE PREFERRED EMBODIMENTS

Figure 1:
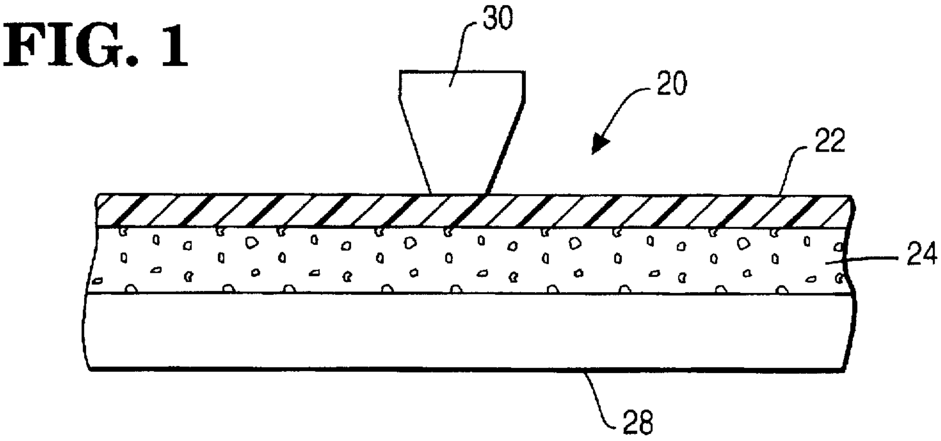
FIG. 1 illustrates a thermal transfer medium of the present invention in a printing operation prior to thermal transfer.
Figure 2:
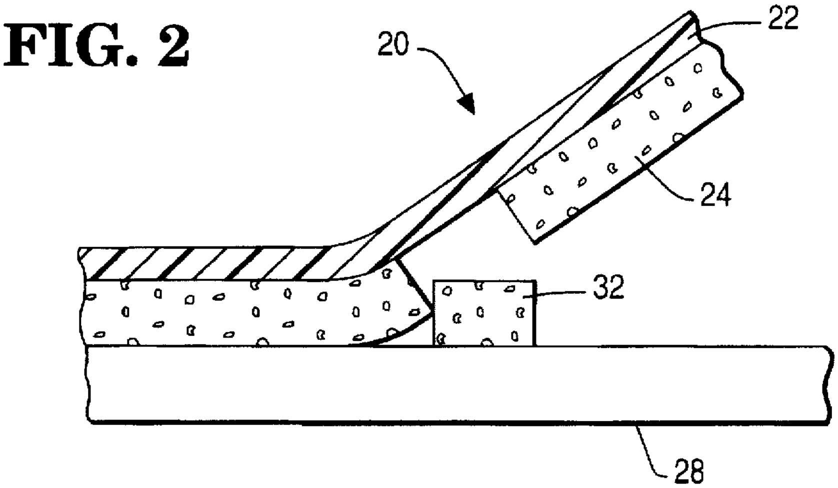
FIG. 2 illustrates a thermal transfer medium of the present invention in a printing operation after thermal transfer.
Figure 3:
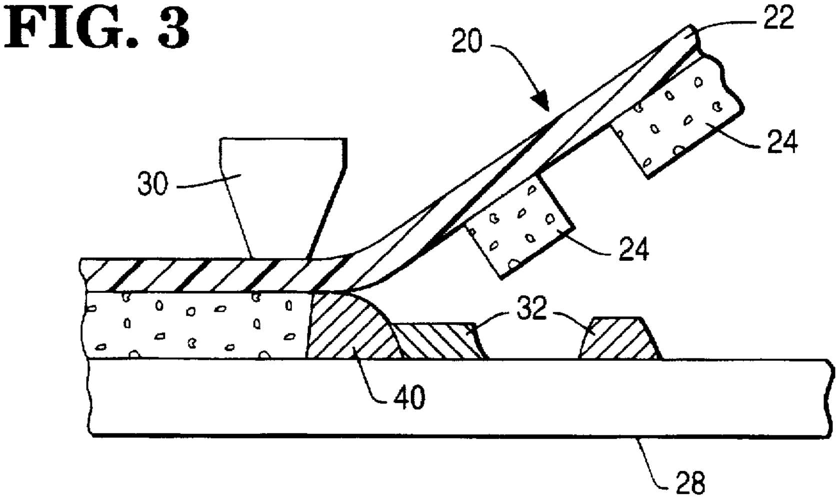
FIG. 3 illustrates a thermal transfer medium of the present invention in a printing operation wherein thermal transfer is taking place.

Thermal transfer ribbon 20, as illustrated in FIGS. 1–3, is a preferred embodiment of this invention and comprises substrate 22 of a flexible material which is preferably a thin smooth paper or plastic-like material. Tissue type paper materials such as 30–40 gauge capacitor tissue, manufactured by Glatz and polyester-type plastic materials such as 14–35 gauge polyester film manufactured by Dupont under the trademark Mylar® are suitable. Polyethylene napthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness and low heat resistance to prolong the life of heating elements within thermal print heads. The thickness is preferably 3 to 50 microns. If desired, the substrate or base film may be provided with a backcoating on the surface opposite the thermal transfer layer.

Positioned on substrate 22 is thermal transfer layer 24. These thermal transfer layers have a softening point below 250° C., preferably below 200° C. and most preferably from 50° C. to 150° C. Softening temperatures within this range enable the thermal transfer medium to be used in conventional thermal transfer printers, which typically have print heads which operate at temperatures in the range of 100° C. to 250° C., more typically, temperatures in the range of 150° C. to 200° C.

The thermal transfer layer comprises a thermoplastic resin which has a melting point above the softening point of the thermal transfer layer. The thermoplastic resins preferably have a melting point in the range of 150° C. to 300° C. Thermoplastic resins with melting points in the range of 150° C. to 225° C. are most preferred. Examples of suitable thermoplastic resins are polyvinyl chloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polystyrene, styrene copolymers, polyamide, ethylcellulose, epoxy resin, xylene resin, ketone resin, petroleum resin, rosin or its derivatives, terpene resin, polyurethane resin, polyvinyl butyryl, synthetic rubber such as styrene-butadine rubber, nitrile rubber, acrylic rubber and ethylene-propylene rubber. Also suitable are polyvinyl alcohol, ethylene alkyl (meth) acrylate copolymers, styrene-alkyl (meth) acrylate copolymer, saturated polyesters and the like. Suitable saturated polyesters are described in U.S. Pat. No. 4,983,446. It is recognized that mixtures of the above-identified resins can be used. In the viewpoint of transfer sensitivity, it is desirable for the thermoplastic rubbers to have a low softening temperature. From the viewpoint of image integrity, it is desirable for these resins to have a high softening temperature. The thermoplastic resin is preferably used in an amount of about 5 to 40 weight percent, particularly 10 to 20 weight percent based on the weight of total dry ingredients of the coating formulation which forms the thermal transfer layer.

The thermal transfer layer also contains a wax. Suitable wax substances include natural waxes such as whale wax, bees wax, lanolin, carnauba wax, rice wax candelilla wax, montan wax and ceresine wax; petroleum waxes such as paraffin wax and microcrystalline waxes, synthetic waxes such as oxidized wax, ester wax, low molecular weight polyethylene and Fisher-Tropsch wax; higher fatty acids such as lauric acid, myristic acid, palmitic acid, stearic acid and behenic acid; higher aliphatic alcohol such stearyl alcohol; ester such as sucrose fatty acid esters, sorbitan fatty acid esters and amides. The wax substances may be used singly or in admixture. The melting points of preferred waxes used in conventional thermal transfer layers range from 75° C. to 175° C., more preferably 100° C. to 150° C. The preferred wax substances used in the thermal transfer layer have melting points at the high end of these ranges to aid the integrity of the printed image. As with thermoplastic resins, higher melting points tend to enhance the integrity of the image obtained, but transfer sensitivity tends to be decreased.

Another component of the thermal transfer layer is a sensible material which is capable of being sensed visually, by optical means, by magnetic means, by electroconductive means or by photoelectric means. The sensible material is typically a coloring agent such as a dye or pigment or magnetic particles. Any coloring agent used in conventional ink ribbons is suitable, including carbon black and a variety of organic and inorganic coloring pigments and dyes, examples of which include phthalocyanine dyes, fluorescent naphthade dyes and others such as cadmium, primrose, chrome yellow, ultra marine blue, titanium dioxide, zinc oxide, iron oxide, cobalt oxide, nickel oxide, etc. In the case of the magnetic thermal printing, the thermal transfer coating includes a magnetic pigment or particles for use in imaging or in coating operations to enable optical, human or machine reading of the characters. The magnetic thermal transfer ribbon 20 provides the advantages of thermal printing while encoding or imaging the substrate with a magnetic signal inducible ink. The sensible material is typically used in an amount from about 5 to 80 parts by weight of the total dry ingredients for the coating formulation which provides the thermal transfer layer.

The thermal transfer layer has as a key component an active plasticizer with a boiling point below 250° C., preferably below 230° C. and most preferably below the print head temperature of the thermal printers employed in generating images and/or unsaturated groups which react at a temperature below 250° C. These plasticizers reduce the softening point of the thermal transfer layer and enable larger amounts of thermoplastic polymer with high melting points to be used. Active plasticizers with a low boiling point can be volatilized during printing which effectively increases the softening temperature of the thermal transfer layer once transferred. Active plasticizers with unsaturated groups which react at temperatures in the range of 60° C. to 250° C. also increase the softening temperature of the thermal transfer layer once reacted. Any plasticizer which is volatile at a temperature in the range given above, which is compatible with the thermoplastic resin and wax, and which can be retained in the thermal transfer layer until use, is suitable. Suitable plasticizers include low molecular weight (less than 25 carbon atoms), organic acids such as unsaturated fatty acids which are preferably liquid at room temperature. Particular examples include linoleic acid (B.P. 220° C.) and linolenic acid (B.P. 230° C.). To incorporate such plasticizers into the thermal transfer layer, it is necessary that its boiling point be above the processing temperatures used in mixing and depositing the thermal transfer on a substrate layer. The coating formulations are typically heated and dried once applied to a substrate at a temperature in the range of 50° C. to 150° C. Lower processing temperatures are preferred so as to prevent the loss of the volatile plasticizer.

Active plasticizers with unsaturated groups which react at temperatures in the range of 60° C. to 250° C. either self-polymerize in the thermal transfer layer, react with other components or absorb ambient oxygen. This effectively increases the molecular weight of the components within the thermal transfer layer and raises the softening point of the thermal transfer layer. Active plasticizers with reactive unsaturated groups include linoleic acid and linolenic acid described above. These monomers are preferred in that they can increase the softening point of the thermal transfer layer by volatilization and reaction of their unsaturated groups. To provide for reaction of temperatures in the range of 100° C. to 250° C., the thermal transfer layer may have incorporated therein a conventional addition polymerization catalyst which is compatible with the thermal transfer resin.

The thermal transfer layer may contain plasticizers, other than those which are volatile at the softening point, to aid in processing of the thermal transfer layer. Suitable plasticizers used are adipic acid esters, phthalic acid esters, ricinoleic acid esters sebasic acid esters, succinic acid esters, chlorinated diphenyls, citrates, epoxides, glycerols, glycols, hydrocarbons, chlorinated hydrocarbons, phosphates, and the like. The plasticizer provides low temperature sensitivity and flexibility to the thermal transfer layer so as not to flake off the substrate. The thermal transfer layer may contain other additives including flexibilizers such as oil, weatherability improvers such a UV light absorbers, and fillers.

The thermal transfer layer can be applied to the substrate by conventional coating techniques such as a Meyer Rod or like wire-round doctor bar set up on a typical solvent coating machine to provide a coating thickness in the range of 0.0001 to 0.0004 inches. This coating thickness equates to a coating weight of between 4 and 16 milligrams per four square inches. Suitable thermal transfer layers are derived from coating formulations having approximately 10 to 55 percent dry ingredients. A temperature of approximately 100° F. to 150° F. is maintained during the entire coating process. After the coating is applied to the substrate, the substrate is passed through a dryer at an elevated temperature but below the boiling point of the volatile plasticizer to ensure drying and adherence of the coating 24 onto the substrate 22 in making the transfer ribbon 20. The above-mentioned coating weight as applied by the Meyer Rod onto a preferred 3 to 12 mm thick substrate translates to a total thickness of 6 to 15 mm. The thermal transfer layer can be fully transferred onto a receiving substrate at a temperature in the range of 75° C. to 200° C.

The thermal transfer ribbon provides the advantages of thermal printing. When the thermal transfer layer is exposed to the heating elements (thin film resistor) of the thermal print head, the thermal transfer layer is transferred from the ribbon to the receiving substrate in a manner to produce precisely defined characters 32 on the document for recognition by the reader. In the case of non-magnetic thermal printing, the image transferred to document 28 defines characters or codes for optical recognition by a machine or human.

FIGS. 1–3 show use of the thermal transfer ribbon of the present invention in a printing operation. FIG. 3 more particularly shows the heating of thermal transfer ribbon 20 by print head 30 where volatilization of plasticizer takes place during transfer of thermal transfer layer 24 onto receiving substrate 28. The heat from the print head 30 softens a portion of the thermal transfer layer 24 resulting transferred portion 40. Loss of the volatile plasticizer from transferred portion 40 results in image 32.

The coating formulation of this invention contains the above-identified solid materials, in the proportions described, in a solution, dispersion or emulsion. Preferably, the solution, dispersion or emulsion is water-rich comprising primarily water and alkanols such as propanol. However, organic solvent based formulations, such as those comprising mineral spirits with a boiling point in the range of 150° C. to 190° C. are also suitable. The coating formulation typically contains the solids in an amount in the range of about 10 to 50 weight percent. Preferably, the coating formulation contains about 30 percent solids. To prepare the coating formulation of the present invention, the ingredients are typically combined as an aqueous emulsion in a ball mill or similar conventional grinding equipment and agitated. Typically, the solids are added as dispersions at about 30 weight percent solids. The wax emulsion is typically the initial material and the remaining components added thereto with minor heating. The composition of the coating formulation and the thermal transfer layer can be controlled so as to adjust the temperature at which the coating is transferred to the receiving substrate.

The images obtained from the coating formulations and thermal transfer layers of the present invention incorporate a higher proportion of high melting thermoplastic resin and therefore, show greater smear and scratch resistance.

The entire disclosure of all applications, patents and publications, cited above and below, are hereby incorporated by reference.

Without further elaboration, it is believed that one skilled in the art can, using the preceding description, utilize the present invention to its fullest extent.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A coating formulation which provides a thermal transfer layer of a thermal transfer medium which softens and flows at a temperature below 250° C., said formulation comprising a solid thermoplastic resin having a melting/softening point in the range of 150° C. to 300° C., an active plasticizer with either a boiling point in the range of 100° C. to 250° C., an unsaturated carbon-carbon double bond which reacts at a temperature in the range of 60° C. to 250° C. or both a boiling point in the range of 100° C. to 250° C. and an unsaturated carbon-carbon double bond which reacts at a temperature in the range of 60° C. to 250° C., a wax and a sensible material.

2. A formulation as in claim 1, wherein a thermoplastic resin has a melting point in the range of 150° C. to 225° C.

3. A coating formulation as in claim 1, wherein the thermoplastic resin is used in an amount of from 10 to 70 weight percent, based on the total dry ingredients.

4. A coating formulation as in claim 1, wherein the active plasticizer has a boiling point below 230° C.

5. A coating formulation as in claim 1, wherein the active plasticizer has a boiling point below 25° C. and an unsaturated carbon-carbon double bond which reacts at a temperature in the range of 60° C. to 250° C.

6. A coating formulation as in claim 5, wherein the active plasticizer is selected from the group consisting of low molecular weight unsaturated fatty acids with less than 25 carbon atoms.

7. A coating formulation as in claim 6, wherein the active plasticizer is selected from linoleic acid and linolenic acid.

8. A thermal transfer ribbon comprising a flexible substrate and a thermal transfer layer which has a softening point below 250° C., wherein said thermal transfer material is formed from a coating formulation of claim 1.

9. A thermal transfer ribbon as in claim 8, wherein the active plasticizer within the coating formulation has a boiling point below 250° C. and unsaturated carbon atoms which react at a temperature in the range of 60° C. to 250° C.

10. A thermal transfer ribbon as in claim 9, wherein the active plasticizer within the coating formulation has a boiling point less than 230° C.

11. A thermal transfer ribbon as in claim 10, wherein the active plasticizer within the coating formulation is a low molecular weight unsaturated fatty acid with less than 25 carbon atoms.

12. A thermal transfer ribbon as in claim 8, wherein the thermoplastic resin within the coating formulation has a melting point in the range of 175° C. to 225° C.

13. A thermal transfer layer as in claim 11, wherein the active plasticizer within the coating formulation is selected from linoleic acid and linolenic acid.

14. A thermal transfer layer as in claim 8, wherein the active plasticizer within the coating formulation contains unsaturated carbon atoms which react at 60° C. to 250° C. and said thermal transfer layer additionally contains an addition polymerization catalyst in an amount sufficient to effect reaction of the active plasticizer.

15. A coating formulation as in claim 1, wherein the thermoplastic resin has a melting/softening point in the range of 175° C. to 225° C.

16. A coating formulation as in claim 1 which additionally contains an addition polymerization catalyst in an amount sufficient to effect reaction of the active plasticizer at a temperature in the range of 60° C. to 250° C.

17. A coating formulation which provides a thermal transfer layer of a thermal transfer medium which softens and flows at a temperature below 250° C., said formulation comprising a solid thermoplastic resin having a melting/softening point in the range of 150° C. to 300° C., an active plasticizer with either a boiling point in the range of 100° C. to 250° C., an unsaturated carbon-carbon double bond which reacts at a temperature in the range of 60° C. to 250° C. or both a boiling point in the range of 100° C. to 250° C. and an unsaturated carbon-carbon double bond which reacts at a temperature in the range of 60° C. to 250° C., a wax and a sensible material, wherein the wax has a melting/softening point in the range of 100° C. to 175° C.

* * * * *